US008526984B2

(12) United States Patent  
Venkatachalam

(10) Patent No.: US 8,526,984 B2  
(45) Date of Patent: Sep. 3, 2013

(54) MANAGING INTERFERENCE DUE TO LOW POWER BSS

(75) Inventor: Muthaiah Venkatachalam, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 416 days.

(21) Appl. No.: 12/889,025

(22) Filed: Sep. 23, 2010

(65) Prior Publication Data

US 2011/0159898 A1  Jun. 30, 2011

Related U.S. Application Data

(60) Provisional application No. 61/291,787, filed on Dec. 31, 2009.

(51) Int. Cl.  
*G06F 15/16* (2006.01)  
*G06F 3/048* (2006.01)  
*H04W 36/00* (2009.01)  
*H04B 15/00* (2006.01)

(52) U.S. Cl.  
USPC .......... 455/501; 455/444; 455/63.1; 714/764; 709/227; 709/206

(58) Field of Classification Search  
USPC ........ 455/444, 63.1, 501; 715/764; 709/227, 709/206  
See application file for complete search history.

(56) References Cited

U.S. PATENT DOCUMENTS

| | | | |
|---|---|---|---|
| 8,289,889 B2* | 10/2012 | Lee et al. | 370/278 |
| 8,380,201 B2* | 2/2013 | Takahashi et al. | 455/436 |
| 2009/0070694 A1* | 3/2009 | Ore et al. | 715/764 |
| 2009/0197631 A1* | 8/2009 | Palanki et al. | 455/522 |
| 2009/0264077 A1* | 10/2009 | Damnjanovic | 455/63.1 |
| 2010/0075694 A1* | 3/2010 | Damnjanovic et al. | 455/452.2 |
| 2010/0113049 A1* | 5/2010 | Lee et al. | 455/450 |
| 2010/0120438 A1* | 5/2010 | Kone et al. | 455/444 |
| 2010/0167730 A1* | 7/2010 | Shin | 455/434 |
| 2010/0265913 A1* | 10/2010 | Gorokhov et al. | 370/331 |
| 2010/0304748 A1* | 12/2010 | Henttonen et al. | 455/436 |
| 2010/0311415 A1* | 12/2010 | Hamabe et al. | 455/425 |
| 2011/0051684 A1* | 3/2011 | Li et al. | 370/331 |
| 2011/0065446 A1* | 3/2011 | Mueck et al. | 455/452.2 |
| 2011/0111745 A1* | 5/2011 | Li et al. | 455/422.1 |
| 2011/0116480 A1* | 5/2011 | Li et al. | 370/332 |
| 2011/0136478 A1* | 6/2011 | Trigui | 455/418 |
| 2011/0223964 A1* | 9/2011 | Ebiko | 455/522 |
| 2011/0261777 A1* | 10/2011 | Maeda et al. | 370/329 |
| 2012/0015681 A1* | 1/2012 | Dalsgaard et al. | 455/517 |
| 2012/0077486 A1* | 3/2012 | Park et al. | 455/422.1 |
| 2012/0100861 A1* | 4/2012 | Zhang et al. | 455/444 |
| 2013/0039194 A1* | 2/2013 | Siomina et al. | 370/252 |

* cited by examiner

*Primary Examiner* — Bobbak Safaipour  
(74) *Attorney, Agent, or Firm* — Thorpe North & Western, LLP

(57) ABSTRACT

A system and method for managing radio frequency interference of a low power base station is disclosed. The method comprises determining that the low power base station is causing substantial interference in a data link between a mobile station and a macro base station. The low power base station is identified as having a closed subscriber group (CSG) that is in CSG-Closed mode. The CSG low power base station is converted from CSG-Closed mode to a CSG-Open mode to allow the mobile station to communicate through the CSG low power base station.

19 Claims, 4 Drawing Sheets

MANAGING INTERFERENCE DUE TO LOW POWER BSS

CLAIM OF PRIORITY

Priority of U.S. Provisional patent application Ser. No. 61/291,787 filed on Dec. 31, 2009 is claimed.

BACKGROUND

The speed and processing power of mobile computing devices are escalating. The increased capabilities of mobile computing devices have enabled the devices to transition from textual displays to graphical displays and more recently to displaying multimedia such as streaming videos and mobile television. The ability to download and display multimedia on mobile communication devices necessitates a significant increase in wireless communication speeds for the mobile computing devices.

One way that wireless communication speeds have been increased is through the use of higher frequency bands, often greater than 2 GHz. The higher frequency bands allow for the use of a signal with wider bandwidth, thereby enabling faster wireless communication speeds. However, signals transmitted in the higher frequency bands also attenuate more quickly in the atmosphere and when traveling through buildings relative to lower frequency signals. The result of using higher frequencies is a smaller cell size and the need for more base stations. However base stations are relatively expensive to construct, operate. and maintain.

One way to reduce the costs of operating additional base stations is to introduce the use of low power base stations. Low power base stations can be used to communicate in areas where signals from traditional base stations have difficulty reaching, such as within buildings such as high rises, malls, hotels, homes, and other areas where significant potential interference may occur such as dense urban locations. Low power base stations have a number of names, such as micro cells, pico cells, and femto cells. Each of these cells are designed to provide an air link connection with mobile devices such as cellular phones and mobile computing devices, mobile internet devices, tablet computers, laptop computers, embedded communication devices in vehicles, and so forth. These mobile devices are commonly referred to as mobile stations.

As the number of deployed low power base stations increases, the potential for interference significantly increases between mobile phones communicating with a macro base station (i.e. a typical base station) and the signals emitted by a low power base station. Interference can be especially difficult when the macro base station and the low power base station each operate on the same frequency assignment.

For instance, a femto cell may be installed in a house to provide an increased coverage level in the house. As a person walks through his or her neighborhood, a connection between the person's cell phone and a macro base station may be overwhelmed by the signal transmitted by the femto cell located in a neighbor's house. This can cause the connection between the cell phone and the macro base station to significantly degrade or drop. Thus, the femto cell (low-power base station) can cause undesirable levels of interference in the communication between the cell phone and the macro base station.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
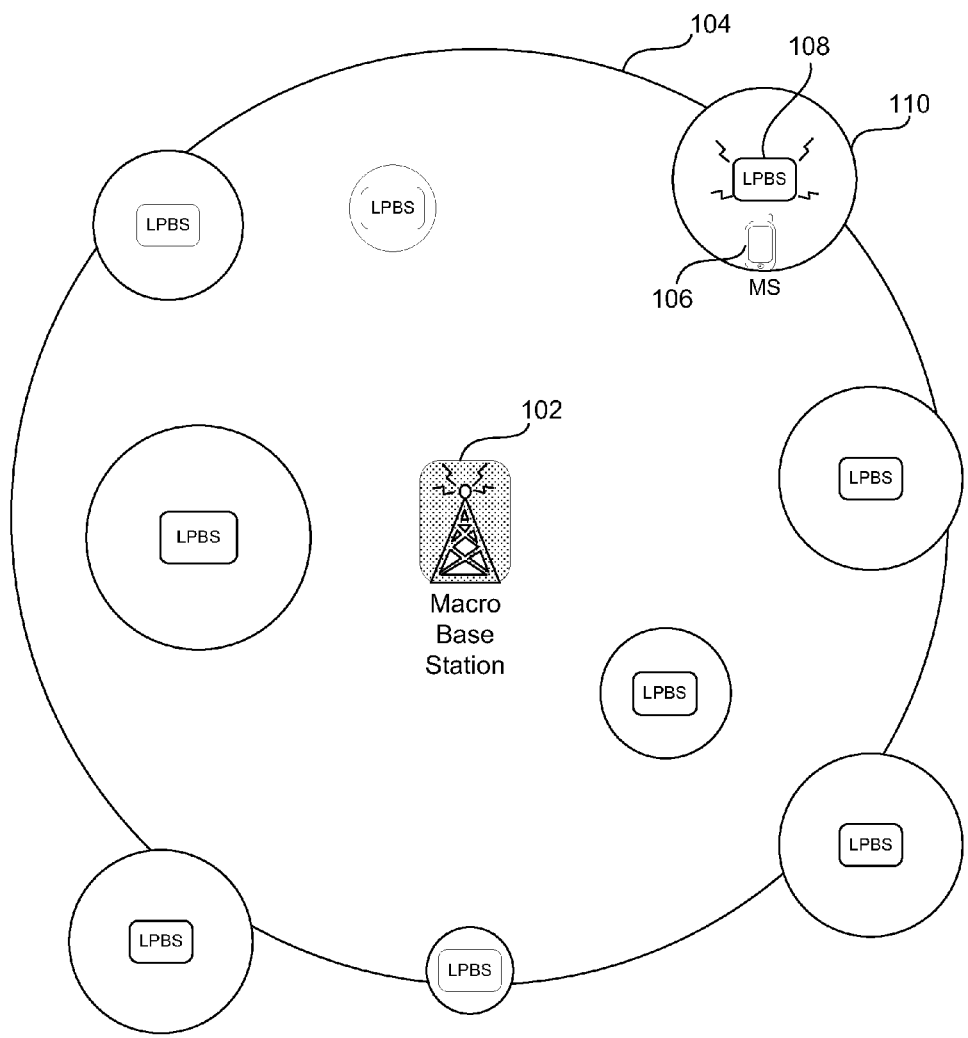
FIG. 1 illustrates a block diagram of a mobile station operating in the range of a macro base station relative to a plurality of low power base stations.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "mobile station" refers to a mobile computing device with a wireless connection to a base station. A mobile station can include cell phones, laptop computers, handheld computing devices, and so forth.

As used herein, the term "low power base station" refers to a base station with a low power to provide a wireless communication link with mobile stations over a limited geographic area, typically with a radius of less than 1000 meters. The term "low power base station" can refer to a micro cell, with a range that is typically less than the 1000 meters, a pico cell, with a range that is typically less than 200 meters, and a femto cell, with a range that is typically less than 20 meters.

As used herein, the term "base station" and "macro base station" refer to a traditional base station, such as the 3GPP Long Term Evolution-Advanced enhanced node B or the IEEE 802.16m base station with a higher power level than the low power base station to provide a wireless communication link with mobile stations over a larger geographic area, typically with a radius greater than 2000 meters.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

The use of low power base stations (LPBS) can cause undesirable interference in connections between mobile stations and a macro base station when the mobile station enters an area covered by the low power base station. When the frequency of the mobile station and the LPBS are the same, it can be difficult to reduce the interference. For instance, in the IEEE 802.16m and Worldwide Interoperability for Microwave Access (WiMAX) long term evolution (LTE) standards, an LPBS, such as a femto cell, and a macro base station may have the same frequency assignment. When this occurs, filtering cannot typically be used to distinguish the signals from the macro base station and the femto cell. Thus, the network may not be able to overcome interference caused by the femto cell.

A low power base station may operate in three different ways: (1) an open LPBS wherein any mobile station can access the LPBS; (2) an LPBS operating with a closed subscriber group (CSG) with the CSG set to open enables mobile stations that are CSG members of the closed subscriber group to receive priority relative to mobile stations that are not members of the group and are in communication with the CSG LPBS; and (3) a CSG LPBS set to closed, where only the mobile stations that are members of the closed subscriber group can access the LPBS.

If an LPBS is operating on the same frequency assignment as a mobile station that travels within the operating range of the LPBS, the wireless connection between the mobile station and the macro base station may be significantly degraded or dropped. If the LPBS is open then a handover of the mobile signal can occur from the macro base station to the LPBS and the mobile station can begin communicating through a wireless link with the LPBS rather than the macro base station. The handover can occur in a relatively short period, typically less than 100 milliseconds (ms). Communication through the LPBS can continue as long as the signal from the LPBS interferes with the signal between the mobile station and the macro base station to a point that makes communication through the macro base station difficult or impossible. Once the mobile station has moved outside of the range of the LPBS then another handover can occur and the mobile station can begin communicating through the macro base station again.

If the mobile station enters within the range of a CSG LPBS set to CSG-Open that has the same frequency assignment as the macro base station, thereby causing substantial interference between the mobile station and the macro base station, then the mobile station can send a request, such as a range request (RNG-REQ) to the LPBS. The LPBS will allow the mobile station to begin communicating through the CSG LPBS so long as members of the closed subscriber group are not using all of the bandwidth available to the CSG LPBS.

However, if the mobile station enters within the range of a CSG LPBS set to CSG-Closed, then the mobile station is typically not allowed to communicate through the CSG LPBS. This may cause significant problems in geographic areas where a dense distribution of LPBS have been distributed, such as urban environments or difficult geographic regions such as mountainous or hilly areas where signals from the macro-cell may not be evenly distributed.

For instance, a neighborhood street in a geographic region where the signal from a macro-cell has relatively low power may include dozens of LPBS. When a person travels down such a street, the person may enter and exit the range of many of the LPBS, depending on the distance of the range extending from the residence. If the LPBS is operating on a different frequency assignment than the macro base station, then there may be only limited interference that can generally be filtered out. However, if a mobile station travels past an LPBS operating on the same frequency assignment as the macro base station then it may cause significant interference problems. When the CSG LPBS is set to closed, there has not been a viable solution. This can result in significantly reduced internet connections and dropped calls for mobile stations travelling through this example area. The problem may be even worse in dense urban environments, where hundreds or even thousands of LPBS may be located near the same location in an area with a significant number of high rise apartments.

FIG. 1 shows one example of a macro base station 102 with a range represented by a circle 104. The range of the macro base station, also referred to as a base station, is often on the order of several kilometers. A mobile station (MS) 106 can communicate via a wireless signal with the macro base station 102. The wireless signal may carry information through modulation schemes such as orthogonal frequency division multiple access (OFDMA), enabling a plurality of mobile stations to communicate within the range. Other types of modulation schemes, such as code division multiple access (CDMA) may be used as well, as can be appreciated.

A plurality of low power base stations (LPBS) 108 may be located within the range of the macro base station 102. Each LPBS can have a selected range 110, represented by the circle. The range of an LPBS designed for use in a home may be relatively small, such as 20 meters, while the range of an LPBS designed for use in a stadium or large hotel may have a range of 200 meters or more. The range of an LPBS may be from as small as 10 meters to over 1000 meters. It should be noted that FIG. 1 is not drawn to scale. The LPBS may be fixed at a permanent geographic location, such as in a house, a hotel, or a mall. The LPBS may also be portable, such as multiple LPBS stationed at a concert or event where a large number of mobile stations may be used temporarily.

When a mobile station 106 that is in communication with a macro base station 102 enters the range 110 of an LPBS 108 with the same frequency assignment as the macro base station, then significant interference may occur. In accordance with one embodiment of the present invention, when the LPBS causes significant interference with a connection between a mobile station and a macro base station, a message can be communicated to the LPBS that it is causing significant interference. The message can include information, such as one or more bits of information, that informs the LPBS that significant interference is occurring. The information may be sent when interference reaches a predetermined level.

The interference level may be measured based on the signal to interference plus noise ratio (SINR). Additional means for determining the interference level may be used as well, such as the bit error rate between the mobile station and the macro base station, the power level of the signal from the macro base station that reaches the mobile station, and so forth.

Figure 2:
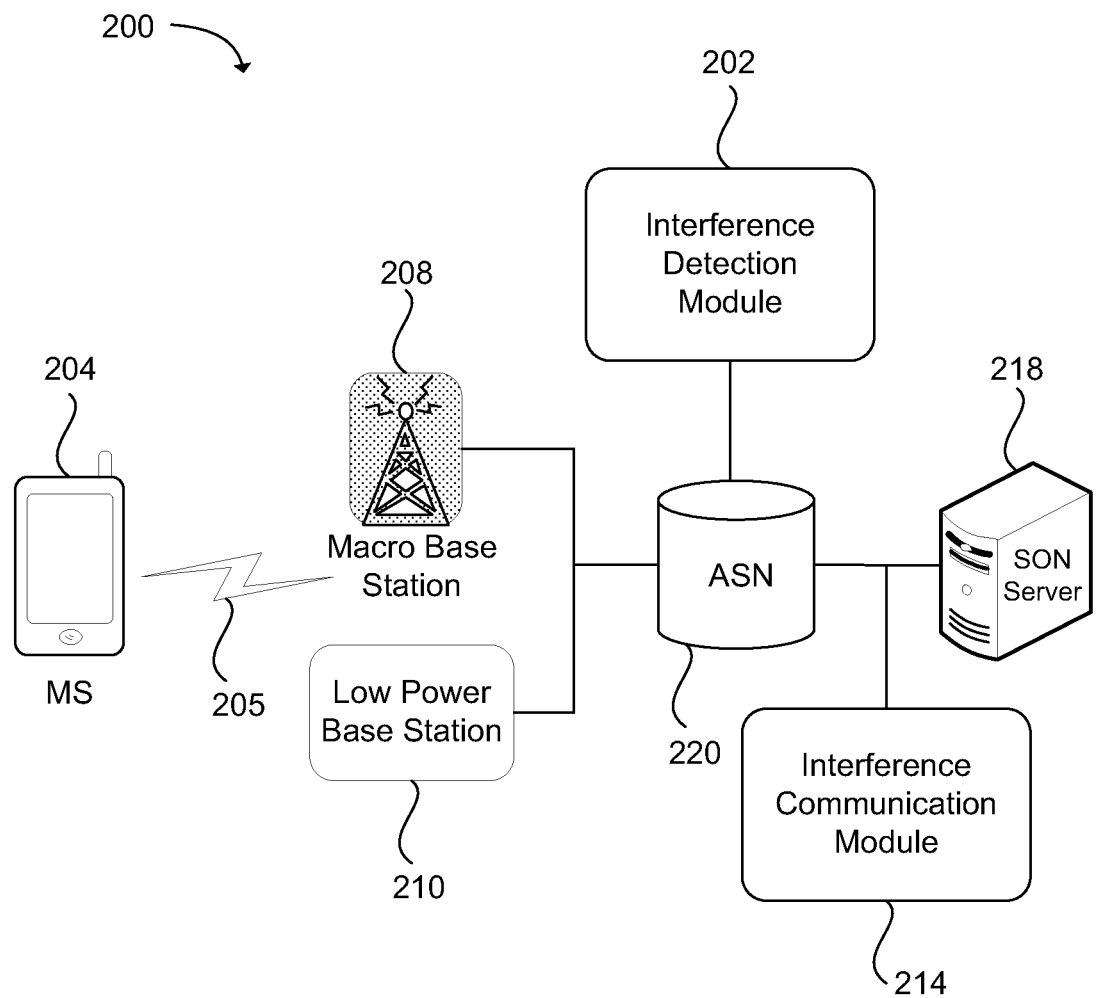
FIG. 2 illustrates a block diagram of an example system for managing radio frequency interference of a low power base station in accordance with an embodiment of the present invention.

FIG. 2 illustrates an example system 200 for managing radio frequency interference of a low power base station. The system comprises an interference detection module 202 configured to monitor radio frequency interference in a wireless link 205 between at least one mobile station 204 and a macro base station 208 caused by a low power base station 210 having a closed subscriber group. The macro base station and the low power base station can have the same frequency assignment. The closed subscriber group may be set to CSG-closed mode, thereby prohibiting the mobile station(s) from communicating through the low power base station.

In one example of a WiMAX system, the macro base station 208 and the low power base station 210 can be in communication with a self optimizing network (SON) server 218 through an access service network 220. The SON interacts with base stations, both low power and higher power, that are on the network to configure and continuously self-optimize their operational algorithms and parameters in response to changes in the network, traffic on the network, and changing environmental conditions. The SON has been codified by the 3GPP Release 8 specifications. The SON server may be located on the ASN, the connectivity service network (not shown), or located on the internet.

The system 200 further comprises an interference communication module 214 that is in communication with a SON server 218. The SON server can communicate a message to convert the CSG low power base station 210 to a CSG-Open mode when the interference detection module 202 indicates that the radio frequency interference is greater than a selected threshold. When the CSG low power base station is placed in the CSG-Open mode then it enables the at least one mobile station 204 to communicate through the CSG low power base station 210 instead of through the macro base station 208.

Figure 3:
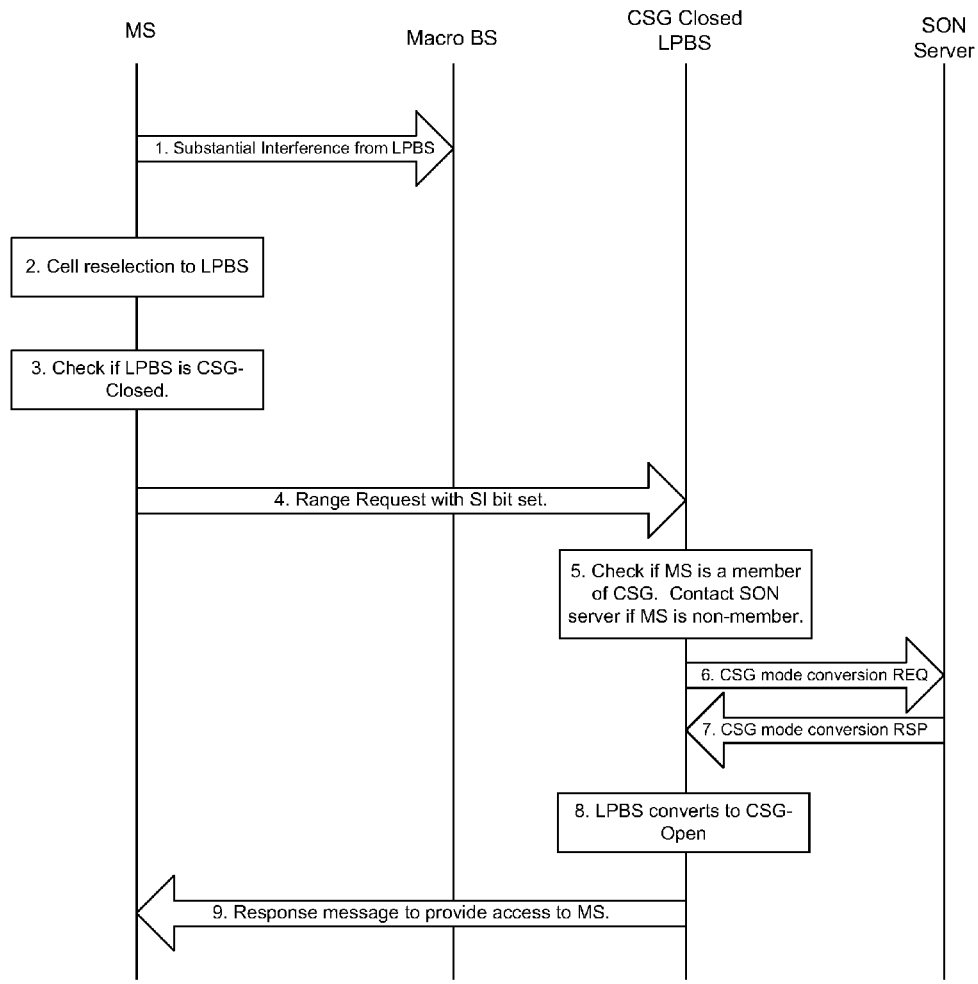
FIG. 3 illustrates a example process for converting a CSG low power base station from a CSG-closed mode to a CSG-open mode when the low power base station is causing significant interference with one or more mobile stations in accordance with an embodiment of the present invention.

FIG. 3 provides one example process for converting the CSG low power base station from a closed mode to an open mode when it is causing significant interference with one or more mobile stations. In this example, the interference detection module 202 (FIG. 2) can be located within the mobile station.

(1) The mobile station (MS) can have a wireless link with the macro base station. As the mobile station enters the range of an LPBS with the same frequency assignment as the macro base station, substantial interference that is caused by the LPBS in the wireless data link can be detected by the interference detection module. (2) The mobile station can attempt a handover from the macro base station to the LPBS. (3) A check can be made to determine if the LPBS is in a CSG-closed mode.

(4) If the LPBS is in a CSG-closed mode, a range request (RNG_REQ) message can be sent from the mobile station to the CSG-closed LPBS. The range request is a request to allow the mobile station to communicate through the LPBS. The range request message can include one or more bits detailing that there is substantial interference in the wireless link with the macro base station that is caused by the LPBS. (5) The CSG Closed LPBS can check to see if the mobile station is a member of the closed services group. If the mobile station is a non-member, then the CSG closed LPBS can contact the SON server. (6) A CSG mode conversion request can be sent from the CSG closed LPBS to the SON server.

(7) The SON server can determine whether or not to change the mode of the CSG LPBS from closed to open. (8) If a determination is made to change the mode, then a CSG mode conversion response can be sent from the SON server to the LPBS to convert it to a CSG-open mode. (9) The CSG-open LPBS can then send a response message such as an RNG_RSP message to the mobile station indicating that the mobile station can communicate through the LPBS. The time from the detection of interference in step (1) to the response message to the mobile station of step (9) can be on the order of 100 ms. This enables a user of the mobile station substantially uninterrupted communication as he passes by the LPBS.

A determination by the SON server as to whether to convert the LPBS from a closed mode to an open mode can be based on a number of factors. Moreover, additional actions may be taken prior to converting the LPBS to a CSG-open mode. For instance, if several messages have been sent to the SON server for the same LPBS, then the SON server may determine that the output power, and therefore the range of the LPBS, is too great. The SON server can send a message to the LPBS to reduce its output power level. If additional CSG mode conversion requests are received from the same mobile station after the power output of the LPBS has been reduced then a response may be sent from the SON server to the LPBS giving the LPBS permission to convert to a CSG-Open mode.

In another embodiment, the SON server may check to see if the mobile station has recently made other requests to convert the status of other LPBS within a similar geographic region. If multiple requests have been received in a relatively short amount of time, such as within tens of seconds, then it can be determined that the mobile station is traveling at a relatively high rate of speed, such as being located in a moving vehicle. If this is determined then the first request may be ignored, as it is determined that there is a high likelihood that the mobile station will be outside of the range of the LPBS either before or shortly after the LPBS has been converted to an open mode.

For example, based on the geographic location of adjacent LPBS, it may be determined that the mobile station is traveling at a rate of speed greater than 20 miles per hour. If this is true, then it may not make sense to convert the LPBS to a CSG-Open mode since the mobile station will travel through the LPBS range in a relatively short period. No response may be sent from the SON server to the LPBS.

The actual rate of speed can depend on the size of the LPBS range. For instance, if the LPBS has a relatively large range, such as 200 meters, then a car traveling past the LPBS may have interference for a several seconds. Therefore, the LPBS may be placed in CSG-Open mode during that period. However, interference by an LPBS having a range of 20 meters may not be sufficiently long to convert the LPBS to CSG-Open mode.

The SON server can also check additional information. For instance, a security check may be made. If a security breach previously occurred at the LPBS, then it may be determined that the LPBS should not be converted to CSG-Open mode. In addition, if members of the closed subscriber group are using all of the available bandwidth of the LPBS then the SON server may not convert the LPBS to CSG-Open mode. Alternatively, even if the LPBS has been converted to CSG-Open mode, access may be limited if the available bandwidth is limited or is currently being used.

When the mobile station has traveled outside the range of the LPBS and minimal interference is detected from the LPBS then the LPBS can send another CSG mode conversion request to the SON server. The SON server can then send the CSG mode conversion response and the LPBS can convert from a CSG-Open mode back to a CSG-Closed mode. This may occur on the order of tens to hundreds of milliseconds after the mobile station is no longer communicating.

In another embodiment, the SON server can determine itself that one or more mobile stations have substantial interference in their data link with the macro base station that is caused by a selected LPBS with a CSG-Closed mode that has the same frequency assignment as the LPBS. When this is determined then the SON server can send a CSG conversion message to the CSG Closed LPBS requesting it to convert to a CSG-Open mode. The LPBS can be kept in a CSG-open mode as long as a mobile station is within the range of the LPBS and the LPBS is providing substantial interference with the wireless link between the mobile station and the macro base station. In this embodiment, the interference detection module 202 may be located in the SON server 218, or another server in communication with the SON server.

Figure 4:
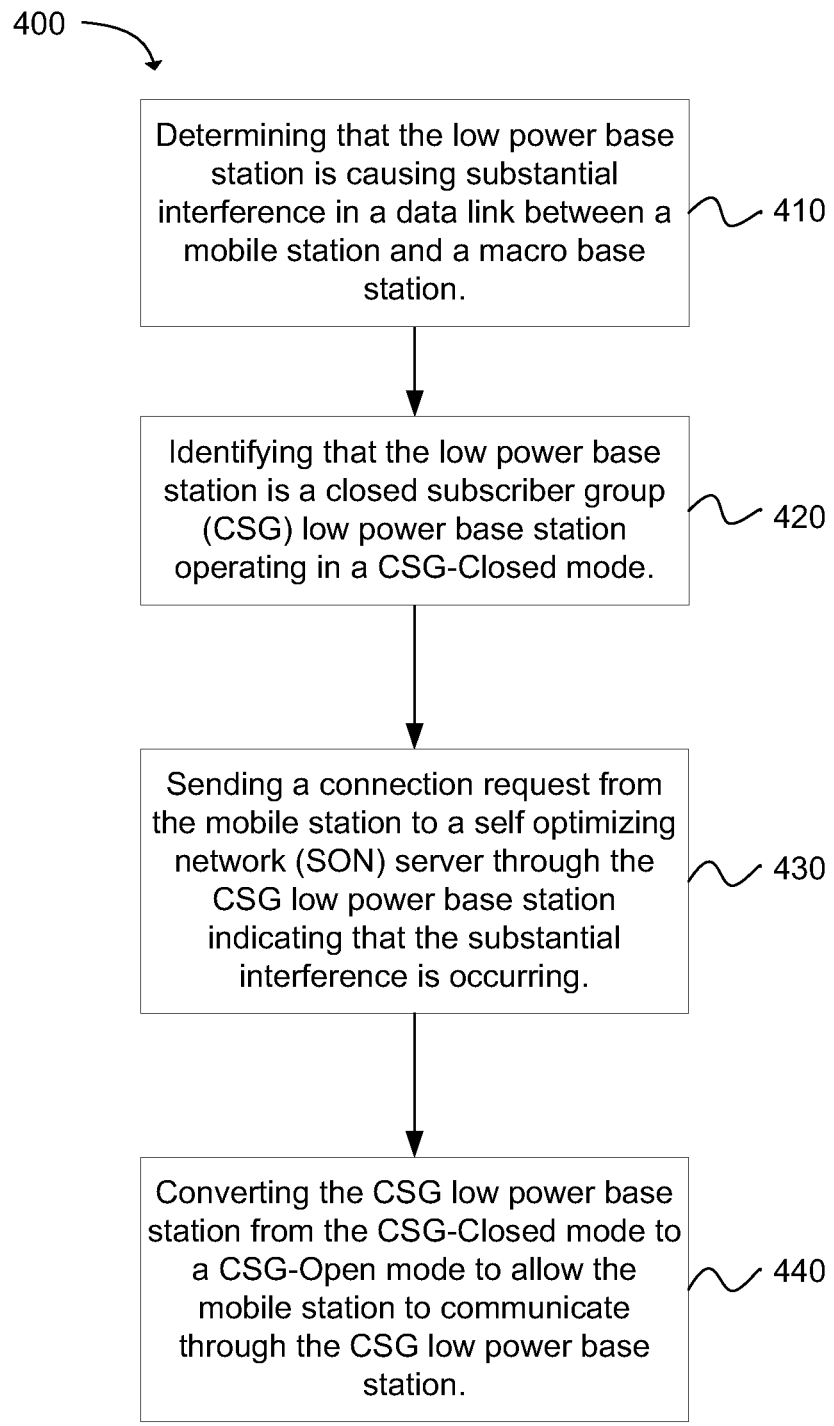
FIG. 4 depicts a flow chart of a method for managing radio frequency interference of a low power base station in accordance with an embodiment of the present invention.

In another embodiment, a method 400 for managing radio frequency interference of a low power base station is disclosed, as depicted in the flow chart of FIG. 4. The method includes determining 410 that the low power base station is causing substantial interference in a data link between a mobile station and a macro base station. For example, a link between the mobile station and the macro base station may be determined to be down. Alternatively, a measurement of the signal between the mobile station and the macro base station may be monitored, such as the signal to interference plus noise ration (SINR). If the SINR value is greater than a predetermined level, then it can be determined that there is substantial interference.

The low power base station can be identified 420 as a CSG LPBS operating in a CSG-Closed mode. A connection request can be sent 430 from the mobile station to a self optimizing network server through the CSG low power base station indicating that the substantial interference is occurring. The indication that substantial interference is occurring may be sent in one or more bits in a range request (RNG_REQ) message from the mobile station to the CSG LPBS. The CSG LPBS can then contact the SON server when the RNG_REQ is received that indicates significant interference and ask for permission to change the CSG LPBS to CSG-Open mode. The SON server can send a mode conversion response to the CSG LPBS based on selected criteria, as previously discussed.

The CSG LPBS can be converted 440 from the CSG-Closed mode to a CSG-Open mode to allow the mobile station to communicate through the CSG LPBS. The CSG LPBS can send a range response (RNG_RSP) message to the mobile station to provide access for the mobile station through the CSG LPBS.

It should be understood that some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for managing radio frequency interference of a low power base station, comprising:
   determining that the low power base station is causing substantial interference in a data link between a mobile station and a macro base station;
   identifying that the low power base station is a closed subscriber group (CSG) low power base station operating in a CSG-Closed mode;
   sending a connection request from the mobile station to a self optimizing network (SON) server through the CSG low power base station, when the mobile station is not a member of the CSG, indicating that the substantial interference is occurring; and
   converting the CSG low power base station from the CSG-Closed mode to a CSG-Open mode to allow the mobile station to communicate through the CSG low power base station.

2. The method of claim 1, wherein determining that the CSG low power base station is causing substantial interference further comprises determining that a link between the mobile station and the macro base station is down.

3. The method of claim 1, wherein determining that the CSG low power base station is causing substantial interference further comprises determining that a link between the mobile station and the macro base station has a signal to interference plus noise ratio (SINR) of greater than a predetermined level.

4. The method of claim 1, wherein sending a connection request from the mobile station further comprises sending a RNG_REQ (range request) message from the mobile station to the CSG low power base station with at least one bit in the RNG_REQ message identifying that there is the substantial interference.

5. The method of claim 4, further comprising enabling the CSG low power base station to contact the SON server when a RNG-REQ message is received and ask for permission to change the CSG low power base station to the open mode to allow the mobile station to communicate through the CSG low power base station.

6. The method of claim 5, further comprising:
   sending a command from the SON server to the CSG low power base station to reduce an output power level of the CSG low power base station when a substantial interference bit is received; and
   converting the CSG low power base station from the CSG-Closed mode to the CSG-Open mode if an additional RNG-REQ message with the substantial interference bit is received to allow the mobile station to communicate through the CSG low power base station.

7. The method of claim 1, further comprising sending a range response (RNG_RSP) message from the CSG low power base station to the mobile station when the SON server determines that the CSG low power base station can be converted to CSG-Open mode.

8. The method of claim 1, further comprising determining that the CSG low power base station is to stay in CSG-Closed mode when it is determined that the mobile station is travelling at a predetermined rate of speed past the CSG low power base station.

9. A system for managing radio frequency interference of a low power base station, comprising:
   an interference detection module configured to measure radio frequency interference in a wireless link between at least one mobile station and a macro base station that is caused by a low power base station having a closed subscriber group (CSG), wherein the macro base station and the low power base station have a same frequency assignment and the mobile station is not a member of the CSG; and
   an interference communication module in communication with a self optimizing network (SON) server that is configured to convert a CSG low power base station to an open mode when the interference detection module indicates that the radio frequency interference in the wireless link is greater than a selected threshold to enable the at least one mobile station to communicate through the CSG low power base station.

10. The system of claim 9, wherein the interference detection module is located in the at least one mobile station and is configured to send a RNG_REQ (range request) message from the mobile station to the CSG low power base station with at least one bit in the RNG_REQ message identifying that there is substantial interference.

11. The system of claim 10, wherein the CSG low power base station is configured to communicate with the interference communication module when the RNG-REQ message is received and ask for permission to change the CSG low power base station to the open mode to allow the mobile station to communicate through the CSG low power base station.

12. The system of claim 9, wherein the CSG low power base station is configured to remain in a CSG-Closed mode when it is determined that the mobile station is traveling at a predetermined rate of speed past the low power base station.

13. The system of claim 9, wherein the interference communication module is configured to communicate with the SON server to monitor an interference level between the at least one mobile station and the CSG low power base station and to transmit a message to the CSG low power base station to convert from a CSG-Closed mode to a CSG-Open mode when the interference level is greater than a predetermined amount to allow the at least one mobile station to communicate through the CSG low power base station.

14. The system of claim 9, wherein the interference communication module is further configured to reduce an output power level of the CSG low power base station when the interference detection module indicates that the radio frequency interference in the wireless link is greater than a selected threshold.

15. A method for managing radio frequency interference of a low power base station, comprising:
   determining that the low power base station is causing substantial interference in a data link between a mobile station and a macro base station;
   identifying that the low power base station is a closed subscriber group (CSG) low power base station operating in a CSG-Closed mode;
   converting the CSG low power base station from the CSG-Closed mode to a CSG-Open mode to allow the mobile station to communicate through the CSG low power base station when the mobile station is not a member of the CSG.

16. The method of claim 15, further comprising sending a RNG_REQ (range request) message from the mobile station to the CSG low power base station with a bit in the RNG_REQ message identifying that there is substantial interference.

17. The method of claim 16, further comprising enabling the CSG low power base station to contact a SON server when the RNG-REQ message is received and ask for permission to change the CSG low power base station to the open mode to allow the mobile station to communicate through the CSG low power base station.

18. The method of claim 17, further comprising:
   sending a command from the SON server to the CSG low power base station to reduce an output power level of the CSG low power base station when a substantial interference bit is received; and
   converting the CSG low power base station from the CSG-Closed mode to the CSG-Open mode if an additional RNG-REQ message with the substantial interference bit is received to allow the mobile station to communicate through the CSG low power base station.

19. The method of claim 16, further comprising enabling a SON server to monitor an interference level between at least one mobile station and the CSG low power base station and to transmit a message to the CSG low power base station to convert from the CSG-Closed mode to the CSG-Open mode when the interference level is greater than a predetermined amount to allow the at least one mobile station to communicate through the CSG low power base station.

* * * * *